US012686464B2

(12) United States Patent
Breitfeld

(10) Patent No.: US 12,686,464 B2
(45) Date of Patent: Jul. 21, 2026

(54) STEERING DEVICE FOR TWO- AND THREE-WHEELED VEHICLES

(71) Applicant: HWG Horst Weidner GmbH, Renningen (DE)

(72) Inventor: Sven Breitfeld, Magstadt (DE)

(73) Assignee: HWG Horst Weidner GmbH, Renningen (DE)

( * ) Notice: Subject to any disclaimer, the term of this patent is extended or adjusted under 35 U.S.C. 154(b) by 719 days.

(21) Appl. No.: 17/927,874

(22) PCT Filed: May 19, 2021

(86) PCT No.: PCT/DE2021/100446
§ 371 (c)(1),
(2) Date: Nov. 26, 2022

(87) PCT Pub. No.: WO2021/239184
PCT Pub. Date: Dec. 2, 2021

(65) Prior Publication Data
US 2023/0202612 A1    Jun. 29, 2023

(30) Foreign Application Priority Data

May 27, 2020    (DE) .......................... 202020103026.4

(51) Int. Cl.
B62K 21/18        (2006.01)
B62K 19/32        (2006.01)
B62K 21/06        (2006.01)
(52) U.S. Cl.
CPC .............. B62K 21/18 (2013.01); B62K 19/32 (2013.01); B62K 21/06 (2013.01)
(58) Field of Classification Search
CPC ......... B62K 21/18; B62K 19/32; B62K 21/06
(Continued)

(56) References Cited

U.S. PATENT DOCUMENTS 3,722,930 A    3/1973    Humlong
4,616,949 A    10/1986    Kellner
(Continued)

FOREIGN PATENT DOCUMENTS

CN        103569287        2/2014
DE        20003227 U1    4/2001
(Continued)

OTHER PUBLICATIONS

Machine translation of DE-20003227 (Allmendinger Apr. 12, 2001) from https://worldwide.espacenet.com/ (Year: 2001).*

*Primary Examiner* — Valentin Neacsu
*Assistant Examiner* — Michael R Stabley
(74) *Attorney, Agent, or Firm* — Smartpat PLC

(57)        ABSTRACT

A steering device for two- and three-wheeled vehicles ensures a rotationally fixed connection between handlebars and a handlebar stem and/or between a handlebar stem and a fork of the vehicle. The steering device has a frame with a head tube, a fork with a stem tube and a handlebar stem with handlebars. A stop can be provided for the handlebars, including a base, which is connected in a rotationally fixed manner to the fork, with a recess, and a stop element, which is securely arranged in the bearing shell and protrudes radially into the recess. In each case one component of the rotationally fixed connection has a smooth cylindrical surface over its axial length, whilst the surface, which is in frictional operative connection with this smooth cylindrical surface in the mounted state, of the other component, which is arranged coaxially to that first-mentioned, is constructed as an n-sided polygon.

6 Claims, 3 Drawing Sheets

(58) Field of Classification Search
USPC ......................................................... 280/279
See application file for complete search history.

(56) References Cited

U.S. PATENT DOCUMENTS

| | | | | |
|---|---|---|---|---|
| 4,946,181 | A | 8/1990 | Romano | |
| 5,078,417 | A | 1/1992 | Mouritsen | |
| 5,553,511 | A | 9/1996 | Marui | |
| 9,475,539 | B2 * | 10/2016 | Ehrhard | B62K 21/00 |
| 11,981,390 | B2 * | 5/2024 | Breitfeld | F16C 35/06 |
| 2003/0021508 | A1 | 1/2003 | Lee | |
| 2006/0076752 | A1 * | 4/2006 | Montague | B62K 15/00 |
| | | | | 280/279 |
| 2012/0063712 | A1 | 3/2012 | Hsieh | |
| 2021/0354775 | A1 * | 11/2021 | Breitfeld | B62K 21/06 |

FOREIGN PATENT DOCUMENTS

| | | | |
|---|---|---|---|
| DE | 102013016536 | A1 | 3/2015 |
| DE | 102018123310 | A1 | 3/2020 |
| FR | 1352718 | A | 2/1964 |
| FR | 2265604 | A1 | 10/1975 |
| GB | 2368826 | A | 5/2002 |

* cited by examiner

STEERING DEVICE FOR TWO- AND THREE-WHEELED VEHICLES

CROSS REFERENCE TO RELATED APPLICATIONS

This application is the U.S. national stage of International Application No. PCT/DE2021/100446, filed on 2021 May 19. The international application claims the priority of DE 202020103026.4 filed on 2020 May 27; all applications are incorporated by reference herein in their entirety.

BACKGROUND

Prior Art

The invention proceeds from a steering device for two- and three-wheeled vehicles, which ensures a rotationally fixed connection between handlebars and a handlebar stem and/or between a handlebar stem and a fork of the two- or three-wheeled vehicle, and a steering device for two- and three-wheeled vehicles having a stop.

Steering devices for two- and three-wheeled vehicles are sufficiently well-known. The rotationally fixed connections are formed by a joining region between a stem and handlebars of the steering device and a joining region between the stem and a stem tube of a fork of the two- or three-wheeled vehicle. A joining region between a stem and a stem tube, and a stem and handlebars is known, in which the contact line of stem and stem tube and of stem and handlebars form a polygonal chain with an arbitrary number of corners. The rotationally fixed connection takes place in this case by means of an interlocking connection between the partners of the joining region (DE 200 03 227 U1).

The disadvantage of such an interlocking connection is that the polygonal cross section of the partners of the joining region, which deviates from a cross-sectional shape, must be produced within a very narrow fit, in order to avoid play between the handlebars and the stem, and the stem and the stem tube. This causes an increased manufacturing outlay of the joining region of the partners of the rotationally fixed connection.

Likewise, stops for handlebars of two- and three-wheeled vehicles are sufficiently well-known. They are used to avoid damaging the frame of the vehicle and the control elements arranged on the handlebars, such as for example gear, brake and clutch levers, in the event of inadvertent excessively wide turning of the front wheel and the handlebars which are connected to the same in a rotationally fixed manner. In this case, stops of this type only become effective in a non-safety-relevant range, so that functional steering of the vehicle is not impaired.

To this end, a stop for handlebars of two-wheeled vehicles is known, which is arranged in the lower headset bearing inside the head tube. For this purpose, the lower headset bearing consists of a base, which is connected to the fork of the vehicle in a rotationally fixed manner, a rolling bearing, and a bearing shell, which is connected to the head tube of the frame of the vehicle in a rotationally fixed manner and into which the base and the rolling bearing can be inserted. A circular arc shaped groove is arranged in the base, which groove is open towards the outer perimeter thereof. Its minimum opening angle conforms with the legal requirements for steering angles of handlebars for two-wheeled vehicles. The bearing shell has a recess extending over the height thereof, which accommodates a stop element. The stop element has two different radial thicknesses over its height, wherein the thickness in the region of the lower rolling bearing is not greater than the radial depth of the open recess of the lower bearing shell. The thickness in the region of the base is chosen to be so large that the stop element protrudes into the circular arc shaped groove of the base. To connect the base to the stem tube of the fork in a rotationally fixed manner, three longitudinal grooves for accommodating one pin in each case are arranged, distributed at the same angular distance from one another over the inner circumference of the base. Part of the lateral surface of the pins protrudes slightly beyond the inner wall of the base into the interior surrounded by the base, so that the base impinged onto the stem tube of the fork is connected to the fork in a rotationally fixed manner. As a result, a secure frictional and interlocking connection is achieved between the fork and base (DE 10 2018 123 310 A1).

The disadvantage of this handlebar stop consists in the manner of the production of the rotationally fixed connection between the stem tube of the fork and the base, in order to ensure the legally specified torque at a level of 60 Nm for torque transmission from the handlebar stem to the vehicle fork. A relevant rotationally fixed connection therefor is that between the base and the stem tube of the fork. The three pins used for this connection, when the base impinges onto the stem tube, cause ridges, i.e. plastic deformations on the same, which is considered non-permitted by the producer of the fork. The second relevant rotationally fixed connection for torque transmission from the handlebar stem to the vehicle fork is that between the lower bearing shell and the stem tube. This takes place in the known manner by means of the impingement of the lower bearing shell, that is to say by means of a press fit.

Finally, a fastening device for a handlebar stem of a cycle is known, in which the connection force of the rotationally fixed connection between the handlebar stem and the stem tube of the fork of the cycle is increased in that toothing is applied onto the upper region of the outer lateral surface of the stem tube of the fork, which is surrounded by the cylinder of the handlebar stem. This toothing can be designed to be sawtooth-shaped or else rectangular or trapezoid in cross section (U.S. Pat. No. 5,553,511 A). In the case of this rotationally fixed connection also, the above-mentioned disadvantages of plastic deformation of the cylindrical inner surface of the handlebar stem occur.

SUMMARY

The invention proceeds from a steering device for two- and three-wheeled vehicles, which ensures a rotationally fixed connection between handlebars and a handlebar stem and/or between a handlebar stem and a fork of the two- or three-wheeled vehicle, and a steering device for two- and three-wheeled vehicles having a stop. The steering device has a frame with a head tube (1), a fork (2) with a stem tube (3) and a handlebar stem (4) with handlebars (7). In addition, a stop can be provided for the handlebars (7), which consists of a base (12), which is connected in a rotationally fixed manner to the fork (2) of the two- or three-wheeled vehicle, with a recess (14) and a stop element (15), which is securely arranged in the bearing shell (11) and protrudes radially into the recess (14).

According to the invention, in each case one component of the rotationally fixed connection has a smooth cylindrical surface over its axial length, whilst the surface, which is in frictional operative connection with this smooth cylindrical surface in the mounted state, of the other component, which is arranged coaxially to that first-mentioned, is constructed as an n-sided polygon.

DETAILED DESCRIPTION

The object of the invention therefore consists in producing a secure rotationally fixed connection between the handlebars and the handlebar stem, and/or the handlebar stem and the stem tube of the fork with a lower manufacturing and installation outlay. Furthermore, a further object consists in producing a secure rotationally fixed connection between the components of the upper or lower headset bearing connected to the stem tube of the fork and/or the stem tube of the frame of the two- or three-wheeled vehicle, into which headset bearing a stop for the handlebars is integrated, with a lower manufacturing and installation outlay.

According to the invention, the object of producing a rotationally fixed connection between the handlebars and the handlebar stem, and/or the handlebar stem and the stem tube is achieved by described herein, and the production of a rotationally fixed connection between the components of the headset bearings to be fixed in a rotationally fixed manner to the stem tube of the fork and/or the head tube of the frame is achieved by further features described herein.

The rotationally fixed connection according to the invention between the handlebars and the handlebar stem, and/or the handlebar stem and the stem tube and/or the components forming the stop of the steering device with the stem tube and/or the head tube of the frame follows a common principle: in each case one component of the rotationally fixed connection has a smooth cylindrical surface over the axial length of the rotationally fixed connection, whilst the surface, which is in frictional operative connection with this smooth cylindrical surface in the mounted state, of the other component, which is arranged coaxially to that first-mentioned, is constructed as an n-sided polygon. The invention can also be applied in the case of motor scooters and e-scooters.

In an advantageous embodiment of the invention, in the case of a component with a polygonal inner surface, the diameter of the circle, to which the edges of the polygon are tangent, is equal to or smaller than the outer diameter of the component coaxially penetrating the said component. Based on the example of the connection between the handlebar stem and the stem tube, this means that the diameter of this circle is not greater than the outer diameter of the stem tube.

By contrast, in the case of a component with a polygonal outer surface, the diameter of the circle which encloses the corners of the polygon is equal to or greater than the inner diameter of the component coaxially surrounding the said component. Based on the example of the connection between a bearing shell which is connected in a rotationally fixed manner to the head tube, this means that the diameter of this circle is not smaller than the inner diameter of the head tube.

For practically understandable reasons, a reduction of the outlay during the production of the components is generally achieved if the larger components involved in the rotationally fixed connection are respectively provided with the smooth lateral surface in the known manner in the region of the rotationally fixed connection. This means that, for example, the inner surface of the head tube of the frame and the outer surface of the stem tube of the fork maintain their cylindrical shape continuously, whilst for example, the outer surface of the bearing shell of the headset bearing and/or the inner surface of the base of the stop have polygonal surfaces.

The rotationally fixed connections according to the invention on steering devices of two- and three-wheeled vehicles act frictionally exclusively. The polygonal surfaces of the one component of the rotationally fixed connection bear with a slight press fit against the cylindrical lateral surface, which is respectively directly opposite it, of the other component of the rotationally fixed connection. Due to the multiplicity of polygonal surfaces, the radial flux of force is optimized in such a manner that a substantially higher torque can be transmitted than the above-mentioned minimum torque amounting to 60 Nm. A further advantage of these rotationally fixed connections consists in the material of the respectively other connection partner not being plastically deformed, as long as the oversize is designed such that the yield point Rp 0.2 of the material is not exceeded. As in the range of a purely elastic deformation of the material, the polygonal surfaces do not leave behind any mechanical damage on the lateral surface of the cylindrical connection partner, such as scratches or notches, the strength and function of this component is not impaired.

This is achieved in that due to the multiplicity of polygonal surfaces in the mounted state, no continuous contact line is created between the connection partners and the polygonal surfaces effect a very gentle introduction of the oversize, which brings about the press fit, in the contact regions. The higher the number of polygonal surfaces is, the lower the oversize has to be with respect to the respectively cylindrical diameter.

In the case of the connection of the handlebars and handlebar stem or handlebar stem and stem tube, as standard, the handlebars and the stem tube will generally also have a smooth cylindrical surface in the joining region with the respectively other component, whilst the handlebar stem is constructed as an n-sided polygon in its joining region with the stem tube and/or the handlebars.

In order to keep the surface pressure of the components to a practicable level in terms of joining technology, it has proven advantageous to choose the number of polygonal surfaces to be not smaller than 10. An optimum with respect to manufacturing outlay and secure transmission of the torque between the components is 25 surfaces.

According to an additional advantageous embodiment of the invention, non-flat, e.g. curved surfaces, are located between the surfaces of the polygon. The surfaces of the polygon may also be distributed non-uniformly, for example only over part of the circumference, over the outer or inner circumference of the component.

According to another advantageous embodiment of the invention, grooves extending in the axial direction are arranged between the surfaces of the polygon. These form a free space for expansion of the material, for example as a consequence of elastic deformation or due to a slight yielding of the material.

In the case of a steering device provided with a stop, the main components of the steering device, that is to say the stem tube and the head tube, will generally have a smooth cylindrical surface, whilst the components which are in operative connection with the respective main component, that is to say the inner lateral surface of the base and the outer lateral surface of the bearing shell, are respectively constructed in their joining region with the stem tube and/or the head tube as an n-sided polygon.

In advantageous embodiments of the steering device with a stop, the diameter ratios between the cylindrical components and the components constructed as an n-sided polygon are designed in the same way as above for the connection of the handlebar stem to the stem tube of the fork and/or the handlebars.

Further advantages and advantageous embodiments of the invention can be drawn from the following description, the claims and the drawings.

BRIEF DESCRIPTION OF THE DRAWINGS

Preferred exemplary embodiments of the subject according to the invention are illustrated in the drawing and are explained in more detail in the following. In the figures

DETAILED DESCRIPTION OF THE PREFERRED EMBODIMENTS

Figure 1:
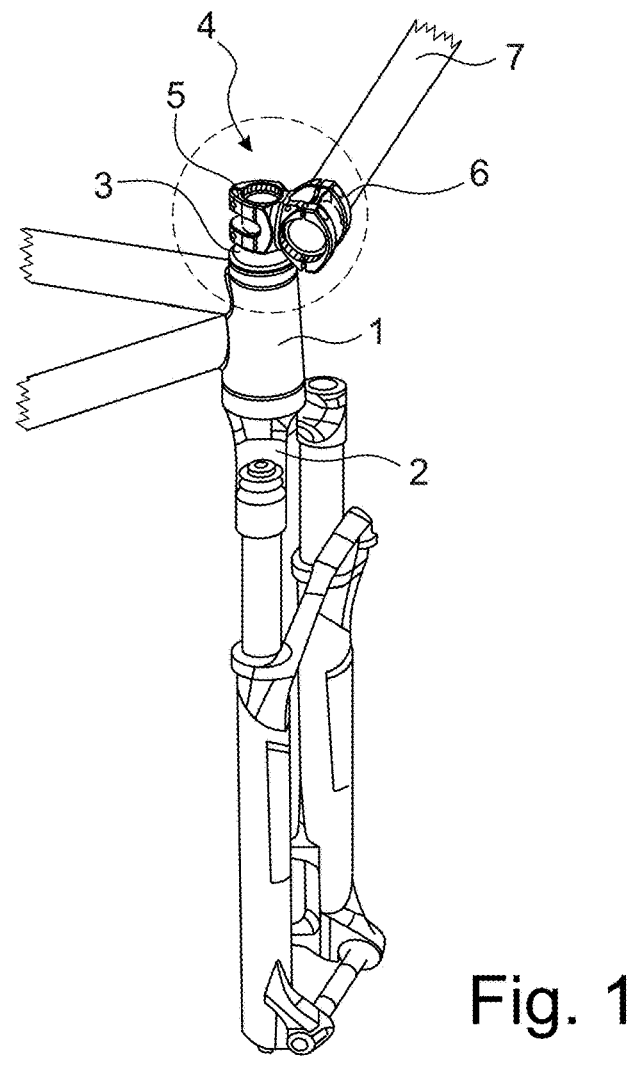
FIG. 1 shows a steering device of a cycle in an isometric exploded illustration.

FIG. 1 shows a steering device of a cycle with a frame, of which only a head tube 1 and two frame tubes emerging from the same are illustrated, and a fork 2 with a stem tube 3, which is guided through the head tube 1, mounted in the same by means of an upper and lower headset bearing, which is not illustrated in more detail, and connected in a rotationally fixed manner at its upper, free end to a handlebar stem 4. The handlebar stem 4 consists of a vertical clamping sleeve 5 and a horizontal clamping sleeve 6 fastened to the same, wherein the central axes of the two clamping sleeves 5, 6 run at right angles to one another. The upper end of the stem tube 3 of the fork 2 is accommodated in a rotationally fixed manner by the vertical clamping sleeve 5, whilst the handlebars 7 of the steering device are guided through the horizontal clamping sleeve 6 and are connected in a rotationally fixed manner to the horizontal clamping sleeve 6. The two clamping sleeves 5, 6 are in each case constructed in the known manner as longitudinally slotted tube sections, one outer lateral surface half of which has a thickening with two through holes, which are arranged at right angles to the respective rotational axis of the clamping sleeves 5, 6, for accommodating clamping means, which are not illustrated here in any more detail.

Figure 2:
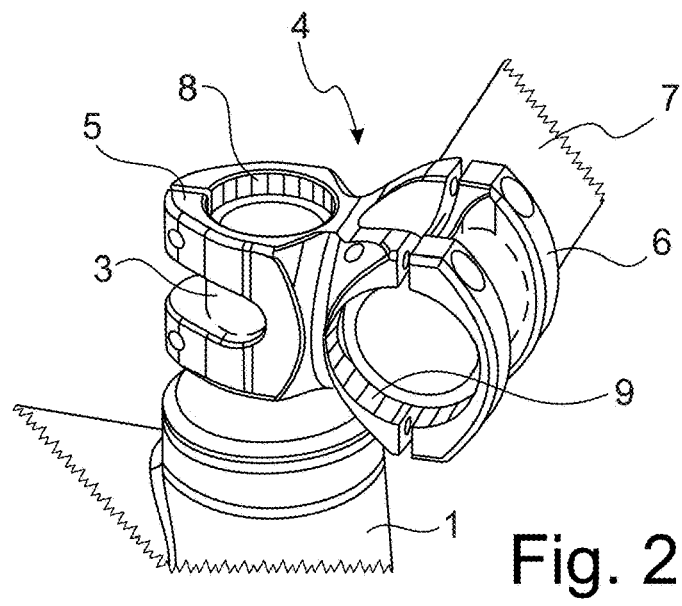
FIG. 2 shows an enlarged exploded illustration of the steering device from FIG. 1.

FIG. 2 shows the handlebar stem 4 in an enlarged illustration, from which, due to an interrupted view of the stem tube 3 and the handlebars 7, the inner lateral surface of the vertical clamping sleeve 5 and the horizontal clamping sleeve 6 can be seen. The inner lateral surface of the vertical clamping sleeve 5, which encloses the upper end of the stem tube 3, is formed by a multiplicity of polygonal surfaces 8, and the inner lateral surface of the horizontal clamping sleeve 6, which encloses the handlebars 7, is formed by a multiplicity of polygonal surfaces 9, whilst the stem tube 3 and the handlebars 7 have their original, cylindrical or annular cross section in this region. In practical implementation, 20 to 30 polygonal surfaces have proven practicable for transmitting the required minimum torque of 60 Nm.

Figure 3:
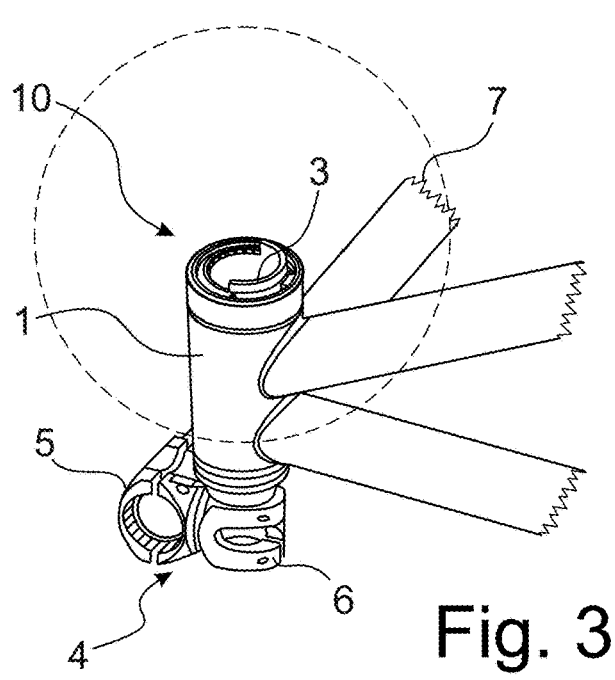
FIG. 3 shows the lower headset bearing of the steering device from FIG. 1 with a stop in a plan view from below as an exploded illustration.
Figure 4:
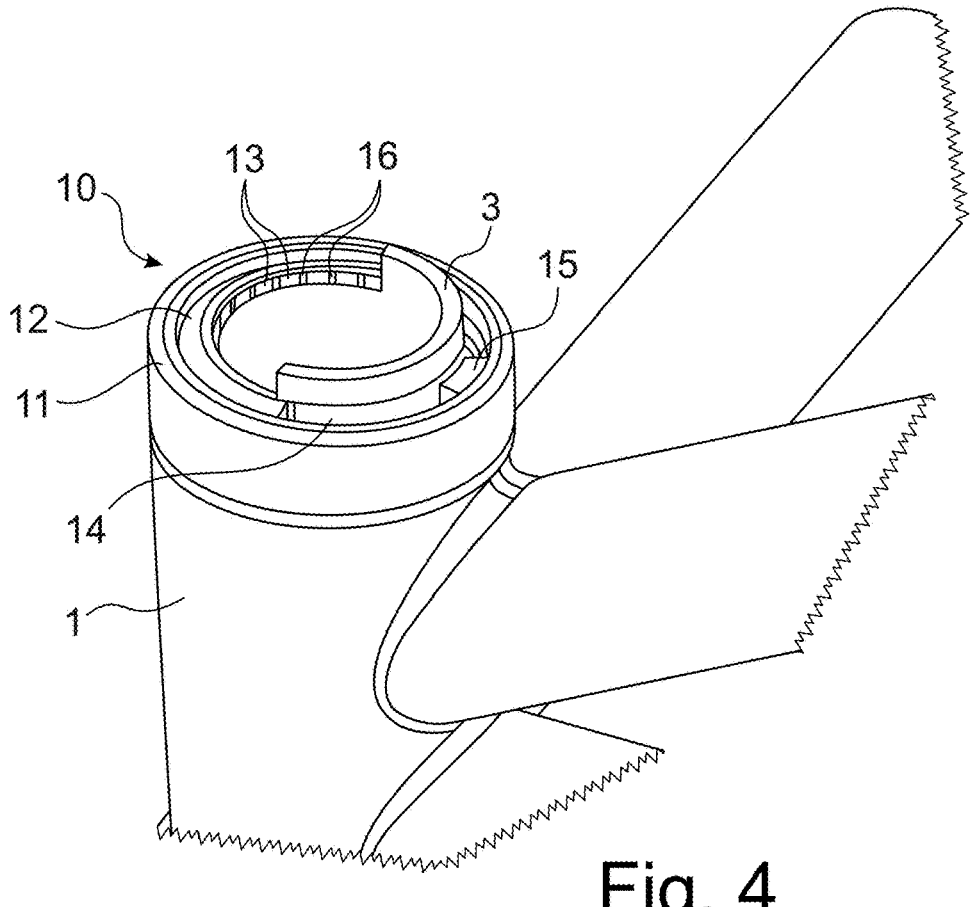
FIG. 4 shows an enlarged exploded illustration of the lower headset bearing of the steering device from FIG. 3.

A further possibility for implementing the invention on the steering device of a two- or three-wheeled vehicle relates to steering devices which are provided with a stop for the handlebars, wherein the stop is arranged in the upper or lower headset bearing, as described for example in DE 10 2018 123 310 A1. To this end, FIG. 3 shows a plan view of a lower headset bearing 10, wherein to recognize the design according to the invention of the torque-transmitting components, only the stem tube 3 of the fork 2 is illustrated, specifically broken on one side. FIG. 4 shows a detail of the lower headset bearing 10 with a stop from FIG. 3 in an enlarged illustration. The lower headset bearing 10 has a lower bearing shell 11, which is connected in a rotationally fixed manner to the head tube 1 of the frame, and a base 12, which is connected in a rotationally fixed manner to the stem tube 3. A lower rolling bearing, which is not illustrated in more detail here, rests on the base 12, the outer ring of which lower rolling bearing is pressed into the lower bearing shell 11. The height of the lower bearing shell 11 corresponds at least to the sum of the height of the base 12 and the lower rolling bearing. The upper edge thereof bears against the lower end face of the head tube 1 in the mounted state. The stem tube 3 is guided through the base 12, the inner ring of the lower roller bearing and the inner ring of the upper rolling bearing, which is likewise not illustrated here, of the upper headset bearing and protrudes as far as into the vertical clamping sleeve 6 of the handlebar stem 4, by which it is accommodated in a rotationally fixed manner, as described above, by the polygonal inner surface thereof.

As can be seen from FIG. 4, the inner lateral surface of the base 12 has a multiplicity of polygonal surfaces 13, whilst the stem tube 3 is an outwardly smooth tube in the known manner. In practical implementation, 20 to 30 polygonal surfaces have proven practicable for transmitting the required minimum torque of 60 Nm. A third of the outer lateral surface of the base 12 is provided with a coaxially running recess 14, which is open towards the outer periphery, so that the angle enclosed by the flanks of the recess 14 is 120°.

A recess for accommodating a stop element 15, which recess runs parallel to the rotational axis of the headset bearing and is open towards the lower rolling bearing, is introduced into the inner lateral surface of the lower bearing shell 11. As can also be seen from FIG. 4, the stop element 15 consists of a cuboid body, the effective height of which corresponds to the height of the lower bearing shell 11 and the width of which corresponds to the width of the open recess. The thickness thereof changes suddenly in the plane in which in the mounted state, the base 12 and the lower rolling bearing lying above the same contact one another, wherein the thickness thereof is dimensioned such in the region bearing against the lower rolling bearing, that the inner lateral surface thereof does not protrude over the inner lateral surface of the lower bearing shell 11. It is advantageous to construct the inner lateral surface of the stop element 15 concavely, so that it runs virtually in continuation of the inner lateral surface of the lower bearing shell 11 and at the same time bears against the outer lateral surface of the lower rolling bearing. In its region opposite the base 12, the stop element 15 has a radially inwardly projecting shoulder, which in the mounted state protrudes into the recess 14 of the base 12. For mounting the stop in the lower headset bearing, this therefore means that when joining the stop element 15 together with the lower rolling bearing into the lower bearing shell 11, the stop element 15 must always be positioned in the angular range of the recess 14. When actuating the handlebars 7, the steering angle is therefore limited by the flanks of the recess 14 striking the stop element 15. Therefore, it is also clear that the lower bearing shell 11 must withstand the torque emanating from the handlebars 7, that is to say must likewise be arranged in the head tube 1 of the frame in a rotationally fixed manner.

Another characteristic of the shaping of the polygonal surfaces 13 of the base 12 can be seen from FIG. 4. A groove 16 extending in the axial direction is provided between the polygonal surfaces 13, which groove forms a free space for accommodating deformations possibly occurring at the polygonal surfaces 13 during the joining of the base 12 on the stem tube 3 of the fork 2. Free spaces of this type can be provided on all polygonal surfaces 8, 9, 17 however.

Figure 5:
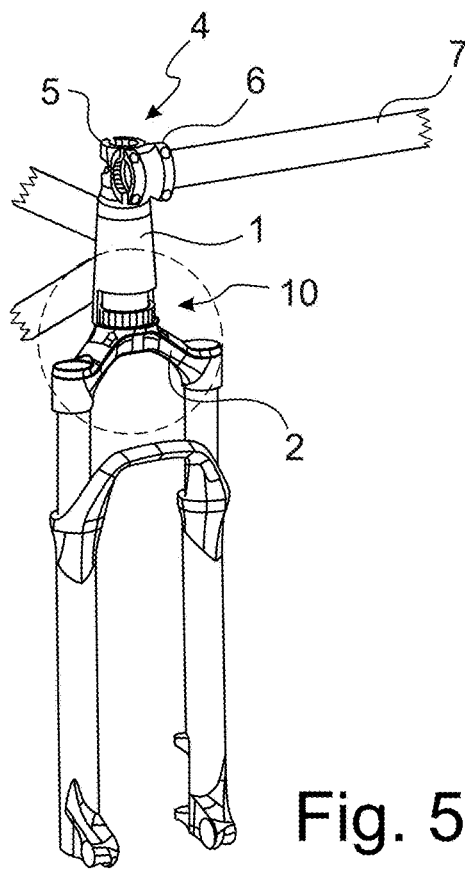
FIG. 5 shows the rotationally fixed connection of the outer bearing shell of the lower headset bearing to the head tube.
Figure 6:
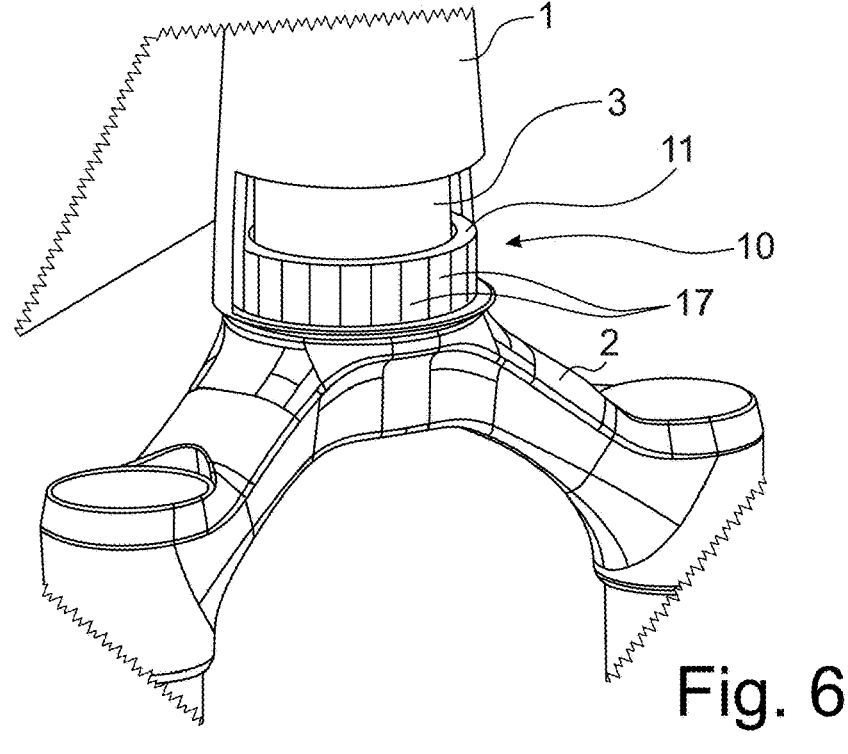
FIG. 6 shows an enlarged exploded illustration of the lower headset bearing of the steering device from FIG. 5.

The implementation of the rotationally fixed connection between the head tube 1 and the lower bearing shell 11 is illustrated in FIGS. 5 and 6. It likewise follows the principle according to the invention of designing the surfaces of the two coaxial connection partners, which contact one another in the mounted state, wherein in the present example, the outer lateral surface of the lower bearing shell 11 is expediently formed by a multiplicity of polygonal surfaces 17, whilst the inner lateral surface of the head tube 1 is constructed as a smooth cylindrical surface. It is noted at this point that all four described rotationally fixed connections can also be designed in the reverse manner, i.e. the lateral surface of the connection partner respectively having the cylindrical shape can also be constructed polygonally.

All of the features presented here may be important for the invention both individually and in any desired combination with one another.

LIST OF REFERENCE NUMERALS

1 Head tube
2 Fork
3 Stem tube
4 Handlebar stem
Vertical clamping sleeve
6 Horizontal clamping sleeve
7 Handlebars
8 Polygonal surfaces of the horizontal clamping sleeve
9 Polygonal surfaces of the vertical clamping sleeve
Lower headset bearing
11 Lower bearing shell
12 Base
13 Polygonal surfaces of the base
14 Recess
Stop element
16 Groove
17 Polygonal surfaces of the lower bearing shell

The invention claimed is:

1. A steering device for two- and three-wheeled vehicles which have a frame with a head tube (1), a fork (2) with a stem tube (3), a handlebar stem (4) with handlebars (7), and a stop for the handlebars (7), the stem tube (3) being guided through the head tube (1) of the frame, mounted in the same, by means of an upper and a lower headset bearing, which have a rolling bearing in each case, and connected in a rotationally fixed manner at its upper end, which protrudes out of the head tube (1) of the frame, to the handlebar stem (4), and the stop being arranged in one of the two headset bearings, the stop consisting of a base (12), which is connected in a rotationally fixed manner to the fork (2) of the two- or three-wheeled vehicle, on the outer lateral surface of which base a circular arc shaped recess (14), which is open towards the inner lateral surface of the bearing shell (11) of the rolling bearing, is located, and a stop element (15), which is securely arranged in the bearing shell (11) and protrudes radially into the recess (14), the lower bearing shell (11) coaxially accommodating the base (12) and the rolling bearing and being connected in a rotationally fixed manner to the head tube (1),
characterized in that for the rotationally fixed connection of the base (12) to the stem tube (3) of the fork (2), the inner lateral surface of the base (12) or the outer lateral surface of the region of the stem tube (3) connected to the base (12) is substantially constructed as an n-sided polygon, and the lateral surface of the respectively other component of the rotationally fixed connection, which is in operative connection with the polygonal lateral surface, is a cylindrical lateral surface, and/or for the rotationally fixed connection of the bearing shell (11) to the head tube (1) of the frame, the outer lateral surface of the lower bearing shell (11) or the inner lateral surface of the region of the head tube connected to the bearing shell (11) is substantially constructed as an n-sided polygon, and the lateral surface of the respectively other component of the rotationally fixed connection, which is in operative connection with the polygonal lateral surface, is a cylindrical lateral surface.

2. The steering device according to claim 1, characterized in that the diameter of the circle, to which the edges of an inner polygon are tangent, is equal to or smaller than the outer diameter of the respectively other component of the rotationally fixed connection, which is in operative connection with the polygonal inner lateral surface.

3. The steering device according to claim 1, characterized in that the diameter of the circle, which encloses the corners of an outer polygon, is equal to or larger than the inner diameter of the respectively other component of the rotationally fixed connection, which is in operative connection with the polygonal outer lateral surface.

4. The steering device according to claim 1, characterized in that the number of polygonal surfaces is not smaller than 10.

5. The steering device according to claim 1, characterized in that the polygon has curved corners.

6. The steering device according to claim 1, characterized in that grooves (16) extending in the axial direction are arranged between the surfaces of the polygon.

* * * * *